(12) United States Patent
Luan et al.

(10) Patent No.: US 8,140,909 B2
(45) Date of Patent: Mar. 20, 2012

(54) EFFICIENT METHOD TO DETECT DISK WRITE ERRORS

(75) Inventors: Leo Shyh-Wei Luan, Saratoga, CA (US); Veera W. Deenadhayalan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 907 days.

(21) Appl. No.: 12/036,168

(22) Filed: Feb. 22, 2008

(65) Prior Publication Data

US 2009/0213487 A1 Aug. 27, 2009

(51) Int. Cl.
*G06F 11/00* (2006.01)

(52) U.S. Cl. ......................................................... 714/42

(58) Field of Classification Search ...................... 714/42
See application file for complete search history.

(56) References Cited

U.S. PATENT DOCUMENTS

| | | | |
|---|---|---|---|
| 5,255,270 A | 10/1993 | Yanai et al. | |
| 5,592,618 A | 1/1997 | Mick et al. | |
| 5,703,888 A | 12/1997 | Matsumoto et al. | |
| 5,872,800 A * | 2/1999 | Glover et al. | 714/766 |
| 6,931,576 B2 | 8/2005 | Morrison et al. | |
| 7,020,805 B2 * | 3/2006 | Talagala et al. | 714/42 |
| 7,076,604 B1 * | 7/2006 | Thelin | 711/112 |
| 7,120,737 B1 | 10/2006 | Thelin | |
| 7,647,544 B1 * | 1/2010 | Masiewicz | 714/770 |
| 7,689,869 B2 * | 3/2010 | Terashita et al. | 714/42 |
| 7,752,489 B2 | 7/2010 | Deenadhayalan et al. | |
| 8,006,126 B2 | 8/2011 | Deenadhayalan et al. | |
| 2002/0161970 A1 * | 10/2002 | Busser | 711/114 |
| 2003/0145270 A1 * | 7/2003 | Holt | 714/766 |
| 2003/0163777 A1 * | 8/2003 | Holt | 714/763 |
| 2004/0153746 A1 | 8/2004 | Talagala et al. | |
| 2005/0005191 A1 | 1/2005 | Judd | |
| 2006/0179381 A1 * | 8/2006 | Durica et al. | 714/736 |
| 2006/0212652 A1 * | 9/2006 | Ishizuka et al. | 711/119 |
| 2006/0212777 A1 * | 9/2006 | Hirao | 714/763 |
| 2006/0294299 A1 | 12/2006 | Edirisooriya | |
| 2007/0168754 A1 * | 7/2007 | Zohar et al. | 714/42 |
| 2009/0172324 A1 * | 7/2009 | Han et al. | 711/162 |

OTHER PUBLICATIONS

Leo Luan and Veera Deenadhayalan, An Efficient Method to Detect Disk Write Errors, IBM Corporation, Oct. 27, 2006, 9 Pages.
Leo Luan and Veera Deenadhayalan Asynchronous Write Verify-an Efficient Method to Detect Disk Write Errors, IBM Corporation, Apr. 26, 2006, 15 Pages.

* cited by examiner

*Primary Examiner* — Bryce Bonzo
(74) *Attorney, Agent, or Firm* — GSS Law Group

(57) ABSTRACT

A write error detection mechanism for a computer data disk drive or storage controller writes and then verifies data to detect disk write errors. It allows the heads to be moved to other tracks to do other jobs in the time it takes the disk to rotate from the point the data was written and to return there again so it can be read to verify the write. The data written is temporarily stored in feature table memory outside the disk, so it can be used as in the comparison later when the written data can be read for the verify. In the interim, other write-and-verify and read operations can be pipelined, or multitasked using the same head, even on different tracks.

20 Claims, 2 Drawing Sheets

EFFICIENT METHOD TO DETECT DISK WRITE ERRORS

FIELD OF THE PRESENT INVENTION

The present invention relates to computer data storage, and in particular to allowing the heads in a disk drive to move away to other jobs on other tracks during the delay it takes the disk to spin around a whole revolution for a verification read in a disk write error detection cycle.

BACKGROUND

Computer storage disks sometimes fail to write the intended data to the rotating disk due to head seek errors, previously undetected disk media defects, mechanical vibrations, and insufficient write current to the heads. Very often the disk write error can be accepted, or it can be corrected with backups or correction algorithms. But, in some applications, especially those involving financial transaction processing, all disk write errors are serious and none can be tolerated.

Conventional disk write error detection methods and devices therefore depend on a write-and-verify techniques. Each disk drive or storage controller will write the data to an intended track location, and then read the data back from that location to check if it matches what was supposed to have been written. The trouble is, the disk read needed to verify the write cannot proceed until the disk has taken a full revolution, and the affected track location has been returned to the heads. In a 10K RPM disk drive, one revolution takes six milliseconds. Many other jobs for the heads will have to queue up and wait for the write-and-verify cycle to complete.

Conventional approaches to detect disk write errors usually come with large performance penalties, e.g., synchronous write verify, or require significant space, overhead, and disk layout changes, such as storing features/checksums of all the data written on disk.

Methods have been tried to prevent silent write errors and to detect phantom writes by saving a CRC or other value associated with a block in a separate storage or memory device and later matched with the block. If the CRC or other value stored with the block does not match the CRC or other value stored separately, a silent write error or phantom write or other error may have occurred and corrective actions may be taken. A signature stored in a memory device may be requested to be identified to be overwritten when signatures from local memory and system storage match.

The prior art includes methods for ensuring data integrity while writing data on storage medium by storing data in temporary storage medium after receipt of data before writing to main storage. The data is then written to at least one data storage device while the data is also retained in the temporary memory. The same data, an ECC code generated from the data, or other chosen criteria are then read from the data storage device and compared to that stored in the memory storage medium or to the data's error checking and correction code. Data is written and compared prior to removing the data from the temporary memory storage medium.

Improved mirroring and dual copy techniques include first storing the data to be copied into a temporary storage location and then comparing that temporarily stored data to a copy written to the mirroring device. Such a check can compare original data against a copy of that data, or an error checking and correction code of each can be compared. In either case, if no error is returned, then the copy is validated and the temporary data is removed. If an error occurred, the data is recopied and the comparison is repeated.

Others have developed methods for detecting a phantom write error when executing a read command pertaining to a data block stored on a storage medium. Upon receiving a read command pertaining to the data block, two version identifiers associated with the data block are compared. The first version identifier is stored within the data block and the second version identifier is stored outside of the data block. If the version identifiers do not match, the possible occurrence of a phantom write error is detected.

Silent errors have been detected by storing a checksum in a location that is independent of the location where the data verified by that checksum is stored.

Conventional data validation methods used in data storage system verify a version identifier integrity meta data (IMD) and check-sum IMD. The checksum is stored separately from the data to detect phantom write error.

A reloadable memory provided with a portion to be written with check data has also been tried. The check data is written each time the memory is loaded with operative data. The written check data is read at a specified time, and judged to see if the read data agrees with the written check data, e.g., to detect an occurrence of abnormality in the memory.

SUMMARY OF THE PRESENT INVENTION

A write error detection mechanism for a computer data disk drive or storage controller writes and then verifies data to detect disk write errors. It allows the heads to be moved to other tracks to do other jobs in the time it takes the disk to rotate from the point the data was written and to return there again so it can be read to verify the write. The data written is temporarily stored in feature table memory outside the disk, so it can be used as in the comparison later when the written data can be read for the verify. In the interim, other write-and-verify and read operations can be pipelined, or multitasked using the same head, even on different tracks.

The above summary of the invention is not intended to represent each disclosed embodiment, or every aspect, of the invention. Other aspects and example embodiments are provided in the figures and the detailed description that follow.

BRIEF DESCRIPTION OF THE DRAWINGS

The present invention may be more completely understood in consideration of the following detailed description of various embodiments of the invention in connection with the accompanying drawings, in which.

Figure 1:
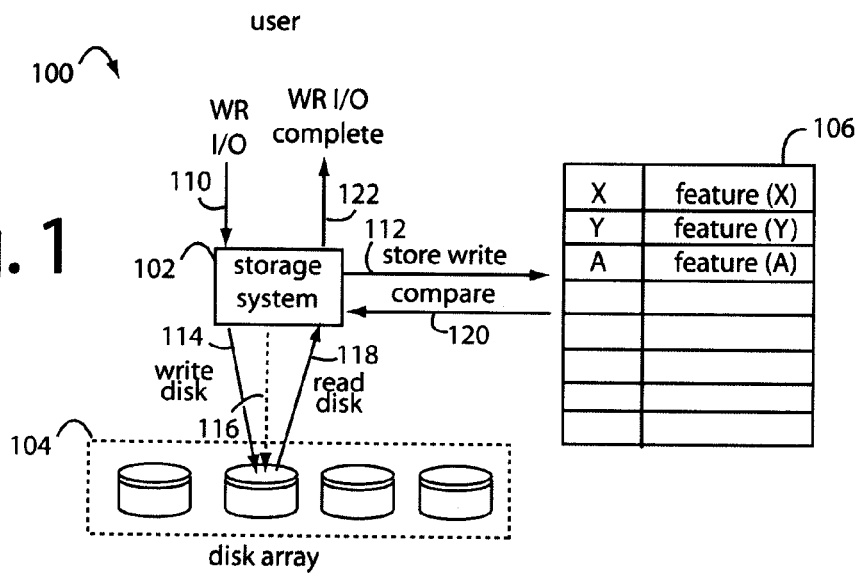
FIG. 1 is a functional block diagram of a write error detection processor in a storage system embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The invention uses feature table memory to store checksums or features, and can asynchronously detect any disk write errors. A disk head is allowed to move away from the track that it just wrote, and it will be returned back at a later time to verify the write checksum/feature when an I/O command is received for some other block in the vicinity, or a read command is issued for the block itself. Allowing the heads to temporarily be moved away, during the whole revolution of the disk it takes for the affected area to return, allows the delays that would otherwise be imposed on other read/writes/ verifies to be reduced. The latency of one revolution of the disk would impose a six millisecond delay for a 10K RPM drive. The checksums/features of any previously written chunks are discarded from the feature table memory after they verify. The technique leverages host reads and parity scrub when available to verify earlier writes. Piggybacked and batched reads of the region of current host I/O's can be issued to leverage current disk head position for write verifies. When write verify cannot be done quickly enough because of extreme I/O loads, checksums/features are migrated to disk by "regions" and read back when needed (when reads of that region start to happen) or when the disk becomes less loaded. The invention detects write errors without the performance penalty that is usually associated with conventional write-verify methods.

FIG. 1 represents a system embodiment, and is referred to herein by the general reference numeral 100. System 100 comprises a storage system 102 with a disk array 104. A feature table memory 106, e.g., a reserved part of a host system's main memory, is used to store write features that have been commanded by the user to be written to disk, but have not yet been verified as having written correctly. In operation, the action begins when a user issues a write I/O command 110. Storage system 102 stores the data, or a feature of the data like a checksum, to feature table memory 106 for comparison later when a readback is available. A write disk command 114 is sent to the particular disk drive in the disk array 104. A command completion is posted by the system to the user and another host I/O can be serviced, e.g., command 116. When a readback of the disk write is available, e.g., the disk has spun around again to the location, then a read disk 118 occurs and a compare 120 looks for a match. If a good match is found, the feature is removed from scratch memory 106 and a I/O complete 122 is issued to the user. Otherwise, a write error handling process can be started, or a time out occurs.

The feature table size in scratch memory 106 is fixed. It does not vary in size with the size of the disk or the I/O rate. A preemptive validate will inject itself if the feature table is at risk of being overrun. The checksums it stores can be migrated to disk under extreme write loading, if necessary. Such checksum table should be stored in non-volatile memory to protect against power outages and system crashes.

Figure 2:
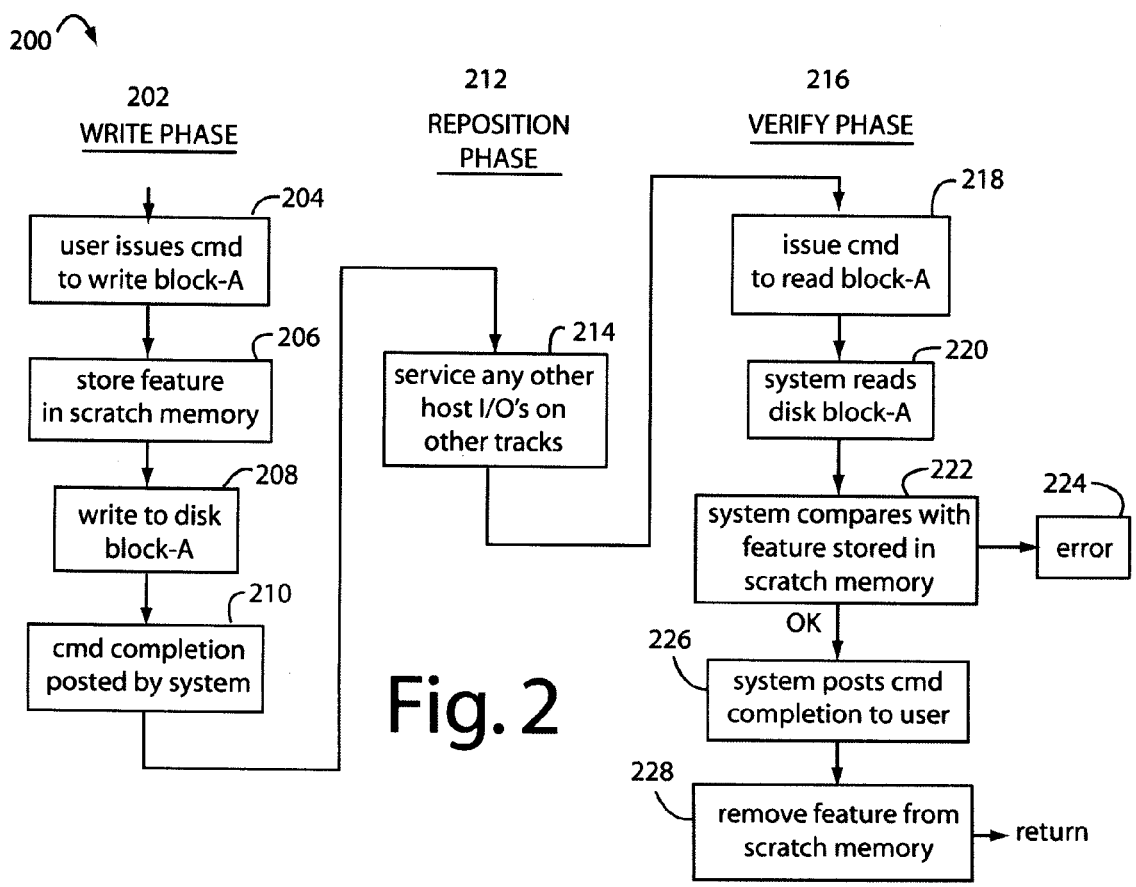
FIG. 2 is a flowchart diagram of a method or computer program for write error detection in a disk storage system.

Referring to FIG. 2, a write phase 202 commences with a step 204 in which the user issues a command to write, e.g., block-A. A step 206 stores the feature(A) in scratch memory for reference later in a verily phase. A step 208 writes the data to block-A on the disk. A step 210 returns a command completion from the system to the user. If an intervening I/O presents itself, a repositioning phase 212 allows a step 214 to service any other host I/O's, even on other tracks. These can include other unrelated and independent writes, reads, and verifies.

Verify phase 216 is preferably added to any other pending read I/O's. It can be opportunistic, and piggyback on local reads. Or, it can be preemptive when the feature table is close to filling up, or when the system is lightly loaded.

A verify phase 216 completes every write phase 202, regardless of any intervening reposition phase 212. A step 218 issues a user command to read block-A. A step 220 causes the system to read disk block-A. A step 222 compares the corresponding feature stored in feature table memory to the read data. If there is not a match, an error step 224 proceeds. Otherwise, a step 226 allows the system to post a command completion to the user. A step 228 removes the feature(A) from the feature table memory.

The error step 224 can include marking the particular disk drive giving the trouble as now off-line. The entire disk could be assumed to be suspect.

In a variation of method 200, such as can be used in a preexisting system that did not previously support write error detection or write-verify cycles, an asynchronous write verify method 200 for a disk storage system includes accepting a block write command from a user, in a step 204. A step 206 stores a feature of a write data into a feature table. A step 208 writes the write data to a disk block. A step 210 posts a command completion to the user. A step 214 allows service of any other host input/output (I/O) which can include moving to another track not containing the disk block. A step 218 accepts a read command of the disk block from the user. A step 220 reads the disk block from the disk block. A step 222 compares what was read from the disk block to a corresponding feature that was stored previously in the feature table. If a match is found, a step 226 posts a command completion to the user, and a step 228 removes the feature from the feature table. Otherwise, if a match is not found, then a step 224 executes an error process.

Figure 3:
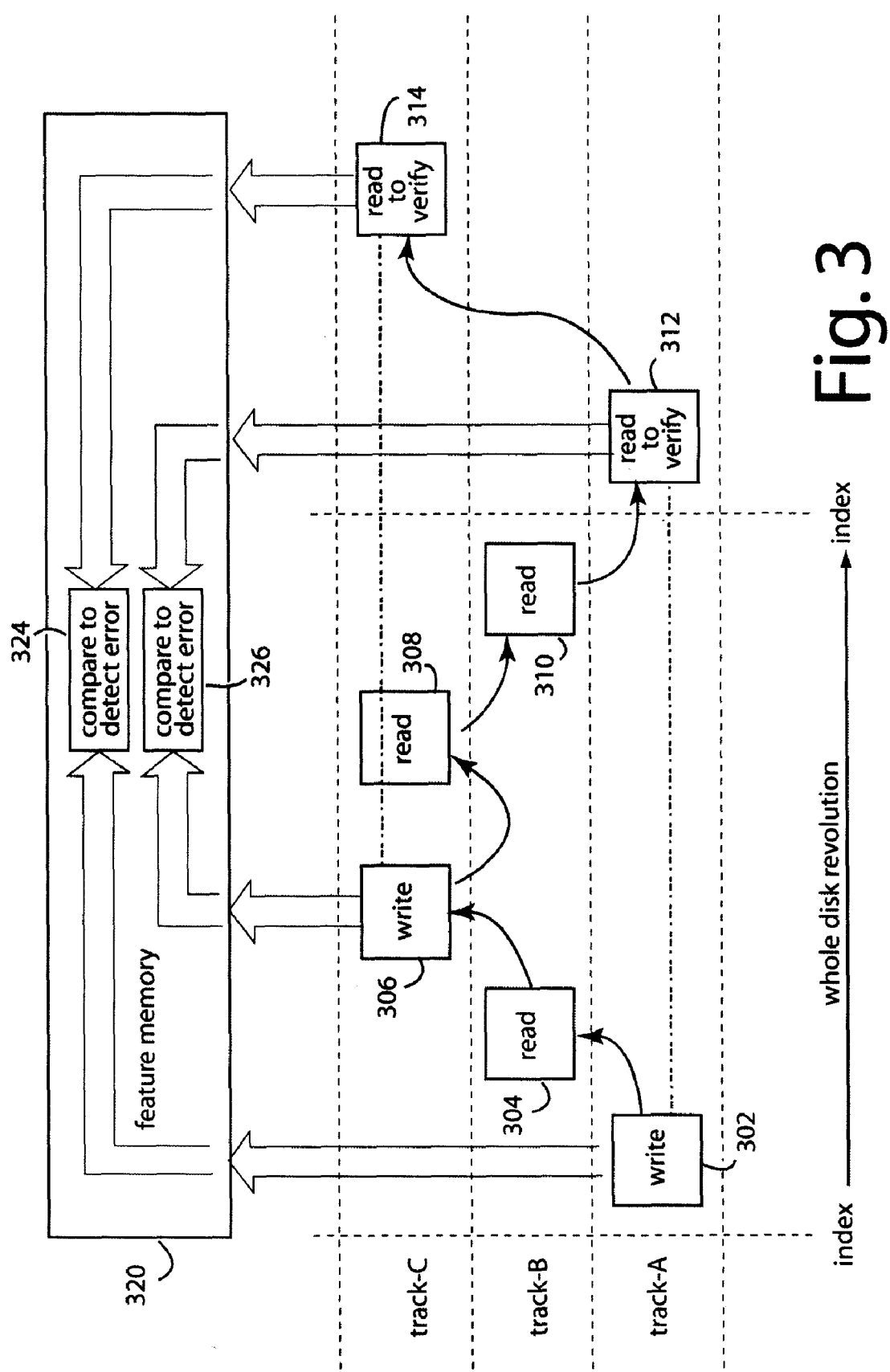
FIG. 3 is a timing diagram for the embodiments of FIGS. 1 and 2 showing how overlapping or pipelined writes can be asynchronously verified during reads that are automatically injected to verify the previous write.

FIG. 3 represents an asynchronous write verify scheme 300 that illustrates how the invention can make use of the otherwise wasted delay time between a disk write and the verification read that checks that the write executed correctly. A write 302, for example on a track-A of a rotating disk, occurs just after an index mark. Such index mark will reoccur when the disk makes a full revolution, about six milliseconds for a 10K RPM drive. In the interim, their is time enough, in this example, for the disk to service a read 304 on a track-B, another write 306 on track-C, a second read 308 on track-C, and a third read 310 on track-B, all before a read-to-verify 312 back on track-A. The second write 306 will have a time overlapping, pipelined, read-to-verify 314 on track-C.

The first write 302 and second write 306 each produce a feature entry into a memory 320. Read-to-verify 312 and 314 can be queued up with other reads to take advantage of temporal and spatial locality, or preemptively anytime after the disk can support such a read after the write. A corresponding compare-to-detect-error processor 324 or 326 with check for write errors, and if none, the memory entry is discarded.

An embodiment of the invention can be implemented with standard, unmodified disk storage controllers and drives, e.g., as an executable computer program recorded in a memory device and run by a host. Users are allowed to make writes to the host I/O that are not verified in the host I/O storage controller or drives. Instead, the feature memory is implemented in the host and all writes are copied and their eventual verifies are automatically executed by ordinary read commands and verified. Such reads are indistinguishable by the storage controller and drives from ordinary reads, and any special read queues or policies to improve read throughput will operate normally. If a write error is detected, then the original write can be executed again, and/or the fault can be flagged for maintenance attention.

While the invention has been described with reference to several particular example embodiments, those skilled in the art will recognize that many changes may be made thereto without departing from the spirit and scope of the invention, which is set forth in the following claims.

What is claimed is:

1. An asynchronous write verify (ASW) method for a disk storage system, comprising:
accepting a block write command from a user;
storing a feature of a write data in a feature table;
write said write data to a disk block;
post command completion to said user;
service any other host input/output (I/O) which can include moving to another track not containing said disk block:
accepting a read command of said disk block from said user:
reading said disk block from said disk block;
comparing what was read from said disk block to a corresponding feature that was stored previously in said feature table;
if a match is found, posting a command completion to the user, and removing said feature from said feature table; and
otherwise, if a match is not found, then executing an error process.

2. The ASW method of claim 1, further comprising:
accepting another block write command from said user in the step of service any other host I/O, such that both have features of their corresponding data writes simultaneously existing in said feature table.

3. The ASW method of claim 1, further comprising:
fixing the size of said feature table so that it does not grow or shrink in capacity.

4. The ASW method of claim 1, further comprising:
allowing the number of said features of write data in said feature table to grow by not immediately reading said disk block from said disk block.

5. The ASW method of claim 1, further comprising:
preventing the number of said features of write data in said feature table from overrunning it by preemptively reading said disk block from said disk block.

6. The ASW method of claim 1, further comprising:
an error process to reattempt writing said write data to a disk block.

7. The ASW method of claim 1, further comprising:
an error process to take a disk drive off-line that failed in the step of comparing.

8. The ASW method of claim 1, further comprising:
migrating said features of write data in said feature table if threatened with overrunning to alternative storage locations.

9. The ASW method of claim 1, further comprising:
recording said features of write data in said feature table by placing in non-volatile memory.

10. An asynchronous write verify (ASW) method for a disk storage system, comprising:
accepting a block write command from a user;
storing a feature of a write data in a feature table;
write said write data to a disk block;
post command completion to said user;
service any other host input/output (I/O) which can include moving to another track not containing said disk block;
accepting a read command of said disk block from said user;
reading said disk block from said disk block;
comparing what was read from said disk block to a corresponding feature that was stored previously in said feature table;
if a match is found, posting a command completion to the user, and removing said feature from said feature table;
otherwise, if a match is not found, then executing an error process;
accepting another block write command from said user in the step of service any other host I/O, such that both have features of their corresponding data writes simultaneously existing in said feature table:
fixing the size of said feature table so that it does not grow or shrink in capacity;
allowing the number of said features of write data in said feature table to grow by not immediately reading said disk block from said disk block;
preventing the number of said features of write data in said feature table from overrunning it by preemptively reading said disk block from said disk block;
an error process to reattempt writing said write data to a disk block;
an error process to take a disk drive off-line that failed in the step of comparing;
migrating said features of write data in said feature table if threatened with overrunning to alternative storage locations; and
recording said features of write data in said feature table by placing in non-volatile memory.

11. An executable computer program in a memory device for asynchronous write verify (ASW) in a disk storage system attached to a host, comprising:
a process for accepting a block write command from a user;
a process for storing a feature of a write data in a feature table;
a process for writing said write data to a disk block;
a process for posting command completion to said user;
a process for servicing any other host input/output (I/O) which can include moving to another track not containing said disk block;
a process for accepting a read command of said disk block from said user;
a process for reading said disk block from said disk block;
a process for comparing what was read from said disk block to a corresponding feature that was stored previously in said feature table;
if a match is found, a process for posting a command completion to the user, and removing said feature from said feature table; and
otherwise, if a match is not found, a process for then executing an error process.

12. The executable computer program of claim 10, further comprising:
a process for accepting another block write command from said user in the step of service any other host I/O, such that both have features of their corresponding data writes simultaneously existing in said feature table.

13. The executable computer program of claim 10, further comprising:
a process for fixing the size of said feature table so that it does not grow or shrink in capacity.

14. The executable computer program of claim 10, further comprising:

a process for allowing the number of said features of write data in said feature table to grow by not immediately reading said disk block from said disk block.

15. The executable computer program of claim 10, further comprising:
a process for preventing the number of said features of write data in said feature table from overrunning it by preemptively reading said disk block from said disk block.

16. The executable computer program of claim 10, further comprising:
a process for an error process to reattempt writing said write data to a disk block.

17. The executable computer program of claim 10, further comprising:
an error process to take a disk drive off-line that failed in the step of comparing.

18. The executable computer program of claim 10, further comprising:
a process for migrating said features of write data in said feature table if threatened with overrunning to alternative storage locations.

19. The executable computer program of claim 10, further comprising:
a process for recording said features of write data in said feature table by placing in non-volatile memory.

20. An asynchronous write verify (ASW) processor for a disk storage system, comprising:
means for accepting a block write command from a user;
means for storing a feature of a write data in a feature table;
means for writing said write data to a disk block;
means for posting command completion to said user;
means for servicing any other host input/output (I/O) which can include moving to another track not containing said disk block;
means for accepting a read command of said disk block from said user;
means for reading said disk block from said disk block;
means for comparing what was read from said disk block to a corresponding feature that was stored previously in said feature table;
if a match is found, means for posting a command completion to the user, and removing said feature from said feature table;
otherwise, if a match is not found, means for then executing an error process;
means for accepting another block write command from said user in the step of service any other host I/O, such that both have features of their corresponding data writes simultaneously existing in said feature table;
means for fixing the size of said feature table so that it does not grow or shrink in capacity;
means for allowing the number of said features of write data in said feature table to grow by not immediately reading said disk block from said disk block;
means for preventing the number of said features of write data in said feature table from overrunning it by preemptively reading said disk block from said disk block;
means for an error process to reattempt writing said write data to a disk block;
means for an error process to take a disk drive off-line that failed in the step of comparing;
means for migrating said features of write data in said feature table if threatened with overrunning to alternative storage locations; and
means for recording said features of write data in said feature table by placing in non-volatile memory.

\* \* \* \* \*